(12) United States Patent
Luciani

(10) Patent No.: US 9,264,519 B1
(45) Date of Patent: *Feb. 16, 2016

(54) EMBEDDING APPLICATION SERVICES IN A DISTRIBUTED DATASTORE

(71) Applicant: DataStax, Inc., Santa Clara, CA (US)

(72) Inventor: T Jake Luciani, Stamford, CT (US)

(73) Assignee: DataStax, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,845

(22) Filed: Dec. 19, 2014

Related U.S. Application Data

(63) Continuation of application No. 13/590,080, filed on Aug. 20, 2012, now Pat. No. 8,924,472.

(60) Provisional application No. 61/525,763, filed on Aug. 20, 2011.

(51) Int. Cl.
  *G06F 15/16* (2006.01)
  *H04L 29/06* (2006.01)
  *H04L 29/08* (2006.01)

(52) U.S. Cl.
  CPC ............ *H04L 67/42* (2013.01); *H04L 67/1097* (2013.01)

(58) Field of Classification Search
  CPC ................. H04L 29/06; H04L 29/0809; H04L 29/06047; G06Q 30/02
  USPC .......................................................... 709/203
  See application file for complete search history.

(56) References Cited

U.S. PATENT DOCUMENTS

| | | | |
|---|---|---|---|
| 7,162,467 B2 | 1/2007 | Eshleman et al. | |
| 7,596,571 B2 * | 9/2009 | Sifry | |
| 8,037,024 B1 | 10/2011 | Bozkaya et al. | |
| 8,214,827 B2 * | 7/2012 | Ben-Arie et al. | 717/178 |
| 8,244,831 B1 * | 8/2012 | McLennan et al. | 709/217 |
| 8,631,094 B1 * | 1/2014 | Alpert | G06F 17/30958 707/631 |
| 8,634,947 B1 * | 1/2014 | Kleinpeter | G06F 17/30752 700/94 |
| 8,825,608 B2 * | 9/2014 | Lipstone | 707/688 |
| 8,935,318 B1 * | 1/2015 | Konerding et al. | 709/203 |
| 9,026,493 B1 * | 5/2015 | Weng | 707/614 |
| 2001/0039565 A1 | 11/2001 | Gupta | |
| 2005/0193021 A1 | 9/2005 | Peleg | |
| 2005/0278422 A1 | 12/2005 | Prust | |

(Continued)

FOREIGN PATENT DOCUMENTS

| | | | |
|---|---|---|---|
| WO | WO-2008/027768 A2 | 3/2008 | |
| WO | WO-2010/019105 A1 | 2/2010 | |

OTHER PUBLICATIONS

United States Office Action for U.S. Appl. No. 13/590,080, Jan. 31, 2014, 11 pages.

*Primary Examiner* — Kostas Katsikis
(74) *Attorney, Agent, or Firm* — Fenwick & West LLP

(57) ABSTRACT

Described embodiments provide systems and methods for building client server applications. The application server code is deployed within a distributed datastore and utilizes the datastore's data locality information to fulfill requests with minimal remote procedure calls (RPC), reduced transfer of data between servers, and shared data caches. The application server inherits the properties of the distributed datastore such as statefulness, replication and failover. Described embodiments also enable the fetching and processing of data in a "big data" environment—a system that contains multiple servers' worth of data, with improved time and bandwidth considerations.

19 Claims, 9 Drawing Sheets

(56) References Cited

U.S. PATENT DOCUMENTS

| | | | |
|---|---|---|---|
| 2007/0061543 A1* | 3/2007 | Uppala | 711/173 |
| 2007/0143369 A1* | 6/2007 | Uppala | 707/204 |
| 2007/0234334 A1* | 10/2007 | Araujo et al. | 717/168 |
| 2009/0248699 A1* | 10/2009 | Alvarez et al. | 707/10 |
| 2009/0260016 A1* | 10/2009 | Ramakrishnan et al. | 718/105 |
| 2009/0313265 A1 | 12/2009 | Sifry | |
| 2010/0269158 A1 | 10/2010 | Ehler et al. | |
| 2011/0196855 A1 | 8/2011 | Wable et al. | |
| 2011/0202929 A1 | 8/2011 | Schleimer et al. | |
| 2011/0276692 A1 | 11/2011 | Waldman et al. | |
| 2011/0288970 A1 | 11/2011 | Kidron et al. | |
| 2012/0110150 A1 | 5/2012 | Kosuru et al. | |
| 2012/0233228 A1 | 9/2012 | Barton et al. | |
| 2012/0233293 A1 | 9/2012 | Barton et al. | |
| 2012/0233522 A1 | 9/2012 | Barton et al. | |
| 2012/0290714 A1 | 11/2012 | Cohen | |

* cited by examiner

EMBEDDING APPLICATION SERVICES IN A DISTRIBUTED DATASTORE

CROSS-REFERENCE TO RELATED APPLICATIONS

This application is a continuation of U.S. patent application Ser. No. 13/590,080, filed on Aug. 20, 2012, which claims the benefit of U.S. Provisional Application 61/525,763, filed on Aug. 20, 2011, each of which are incorporated by reference herein in their entirety.

BACKGROUND

1. Field of the Invention

The disclosed embodiments relate generally to techniques for building client server applications. In particular, described embodiments include systems and methods for efficient interactions between application servers and distributed datastores.

2. Description of Related Art

Traditional client/server computing architectures are typically composed of two main components: the compute and storage tiers. The compute tier is sometimes broken down into the access and logic tiers, but their purpose remains the same (compute). These tiers are often physically separated on different computers for isolation, scaling, and other purposes. As requests are served by the compute tier, data is fetched and processed from the storage tier and manipulated before being sent back to the requesting client.

Components in the access tier manage the communication from clients. The logic tier includes algorithms to service requests from the access tier. The storage tier contains data stored in a persistent mechanism. By way of example, a remote client contacts a server with a request. This server contains both the access and logic tiers. The server communicates with the storage tier, in this case a remote database, and pulls data back to itself. It then applies business logic to this data and returns a response to the remote client. As the number of clients increases, the server tier can be scaled larger by the addition of more nodes. Servers are stateless, as data itself is stored in the storage tier. The traditional storage tier, however, does not scale by adding more database servers; there is no logic for partitioning data across a set of database servers. FIG. 1 illustrates a traditional three-tiered application utilizing a traditional datastore. A client 102 sends a request to a server 104; the server 104 fetches required data from a database 106 to fulfill the request and sends the appropriate response back to the client 102.

An application server is a piece of software code running in a service container or framework that is accessed over a network by other software. The application server provides logical ability to process data, but it stores data in a storage tier. This means that if an application server is restarted or shutdown, its processing ability is lost but data stored in the separate storage tier is available upon the application server's return.

One type of storage tier instance is a distributed datastore (FIG. 3), which is designed to scale by managing the distribution, replication and locality of data. Some distributed datastores have a master lookup node for tracking what data exists on which nodes; some using a hashing scheme; others have a gossip-based protocol for this. In any case, the effect is that a datastore client can access any data required on any of the datastore nodes transparently to the datastore client. Each node in the distributed datastore has a service layer that allows other nodes to communicate with it as well as a way for external applications to interact and read or write data to it.

Distributed datastores often contain built-in logic to manage replicas of individual pieces of data across multiple physical machines. This replication ensures availability of individual data despite individual machine failure.

FIG. 2 illustrates replication of data sets in a distributed data store. For a given piece of data, it is contained in a replica group—a logical collection of individual pieces of data. That data is then replicated across multiple servers for redundancy, high availability, etc. To account for data sets that are greater than a single server's resources, individual replica groups are partitioned across the set of all servers. In this illustration, the replica group 1 and replica group 2 represent the sum of all data—50% each. There are 4 servers, and each piece of data is replicated twice. Database server 1 and database server 2 maintain the copies of replica group 1, while database server 1 and database server 2 maintain the copies of replica group 2.

SUMMARY

Described embodiments provide systems and methods for building client server applications. The application server code is deployed within a distributed datastore and utilizes the datastore's data locality information to fulfill requests with minimal remote procedure calls (RPC), transfer of data between servers, and shared data caches. The application server inherits the properties of the distributed datastore such as statefulness, replication and failover.

Described embodiments also enable the fetching and processing of data in a "big data" environment—a system that contains multiple servers' worth of data, with improved time and bandwidth considerations. The integration of the application server with the datastore eliminates network hops and transfer of data.

DETAILED DESCRIPTION OF THE PREFERRED EMBODIMENTS

In described embodiments, an application process is embedded in the distributed datastore process and the distributed datastore's locality information is used to make the application server aware of the locality of data in the cluster. Locality refers to information describing where a given piece of data physically resides in a set of computers that act together to provide greater computing resources. This allows the application server to either proxy requests to other nodes that have the data locally or access the local data without a remote call since the datastore APIs are available internally.

Figure 1:
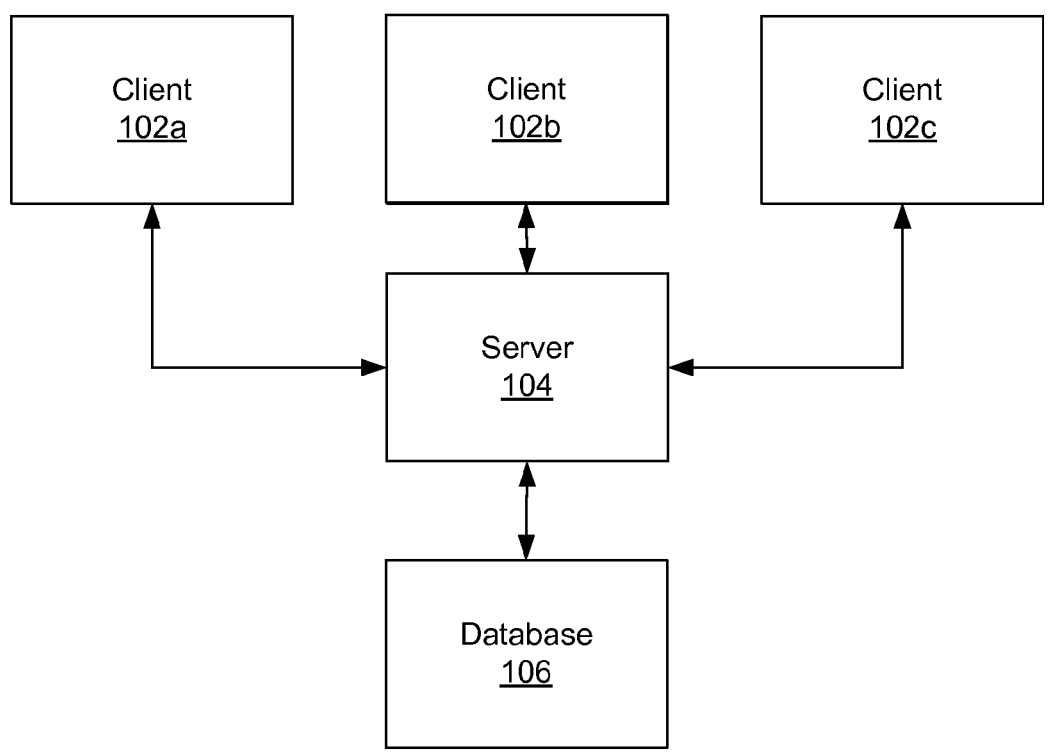
FIG. 1 illustrates a conventional three-tiered application utilizing a traditional datastore.
Figure 2:
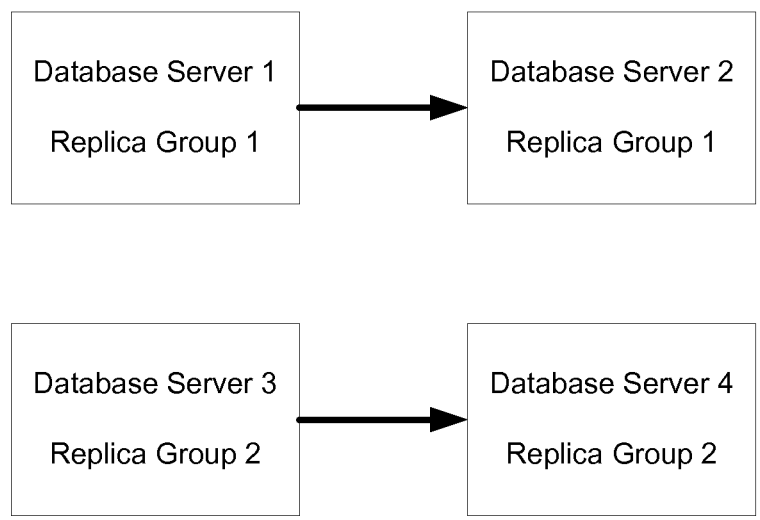
FIG. 2 illustrates conventional replication showing multiple datastore servers with data replication shown.
Figure 3:
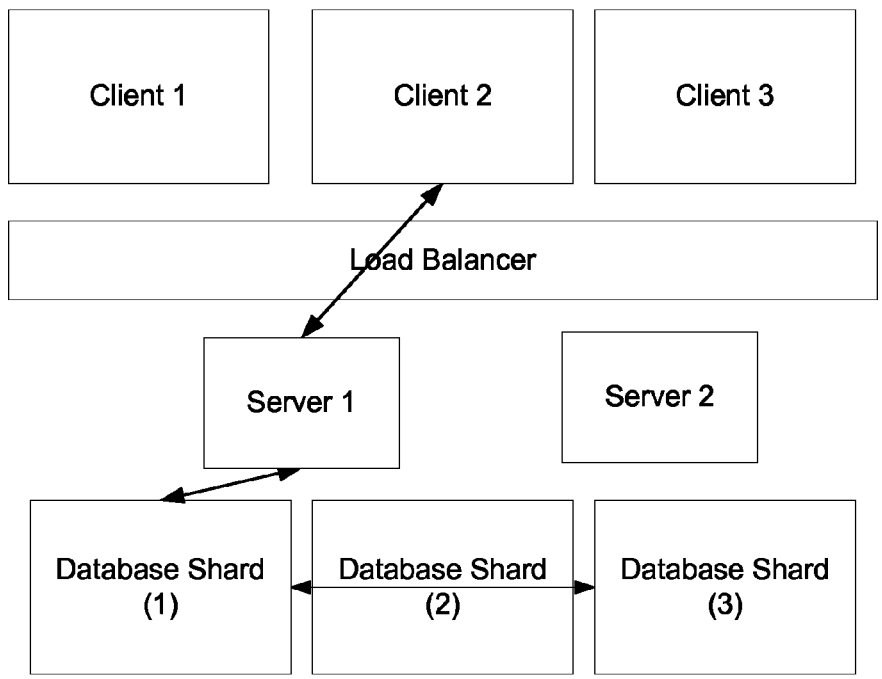
FIG. 3 illustrates a conventional three-tiered application as the storage tier scales.
Figure 4:
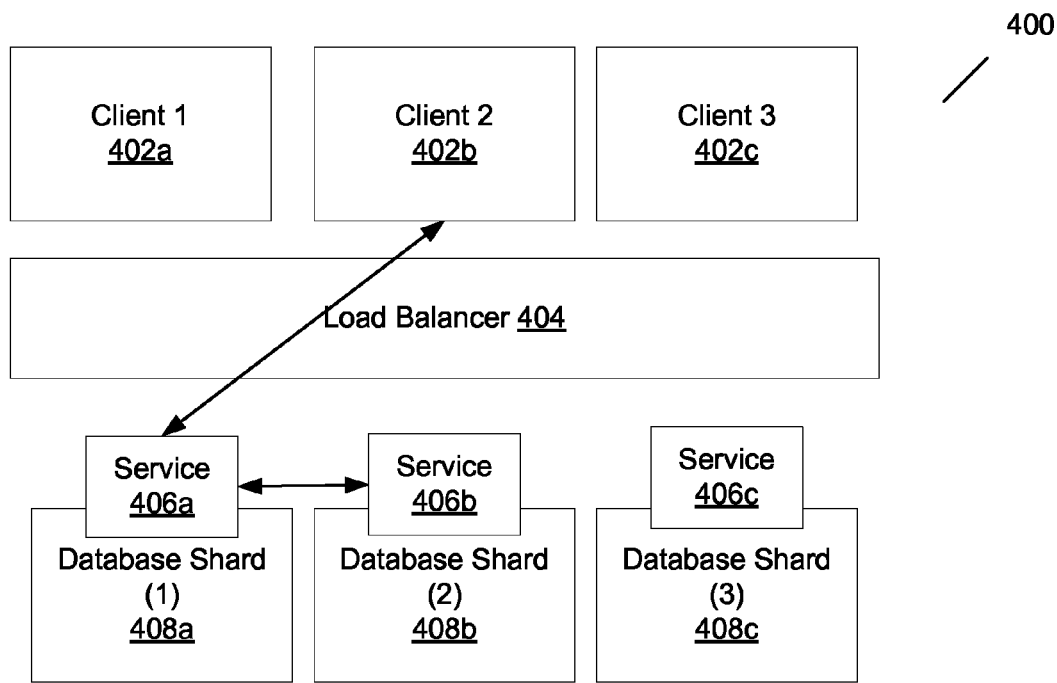
FIG. 4 illustrates a tiered application utilizing an embedded server in a distributed datastore in accordance with one embodiment.

FIG. 4 illustrates an example architecture 400 in which distributed datastores 408 include embedded web containers 406 that receive client requests via a load balancer 404. Web container 406 is a process that serves HTTP requests and often includes a unique session per user. In a conventional system the session data is fetched from a remote datastore server by the web container and brought to the web container per request. If the session is large this slows down traffic. Conversely, as in FIG. 4, since the web container 406 is embedded in the distributed datastore 408 then the web container can identify the nodes that hold the session information for the client 402 that made the request without interacting with a separate computer system. This is possible because web container 406 uses the data locality API in the distributed datastore 408 running in the same memory space as the web container 406. If the web container 406 determines the session is located on its local disk via the locality API of the datastore, it can use the distributed datastore's read API to read the session information locally. If the session information is located on another node, the container can identify the nodes that have this information and forward the request to one of those nodes, thereby removing the need to pull the session information over the network for each request.

Figure 5:
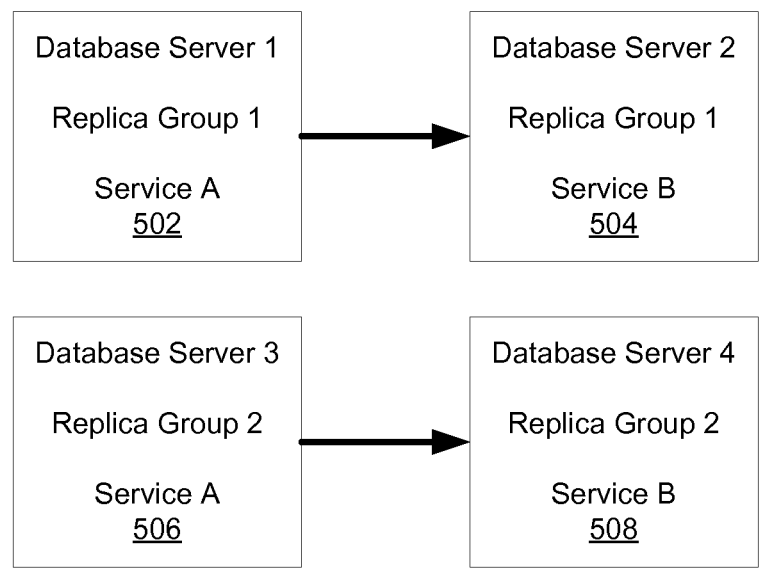
FIG. 5 illustrates utilizing replication groups for workload isolation of different compute processes in accordance with one embodiment.

FIG. 5 illustrates an implementation of workload isolation utilizing the distributed datastore's replication strategy. By running different compute workloads (labeled as "service A" 502, 506 or "service B" 504, 508 in the diagram) on different replica groups, each workload has access to the same data but with physical separation. This physical separation implies that one compute workload will not affect the other.

Figure 6:
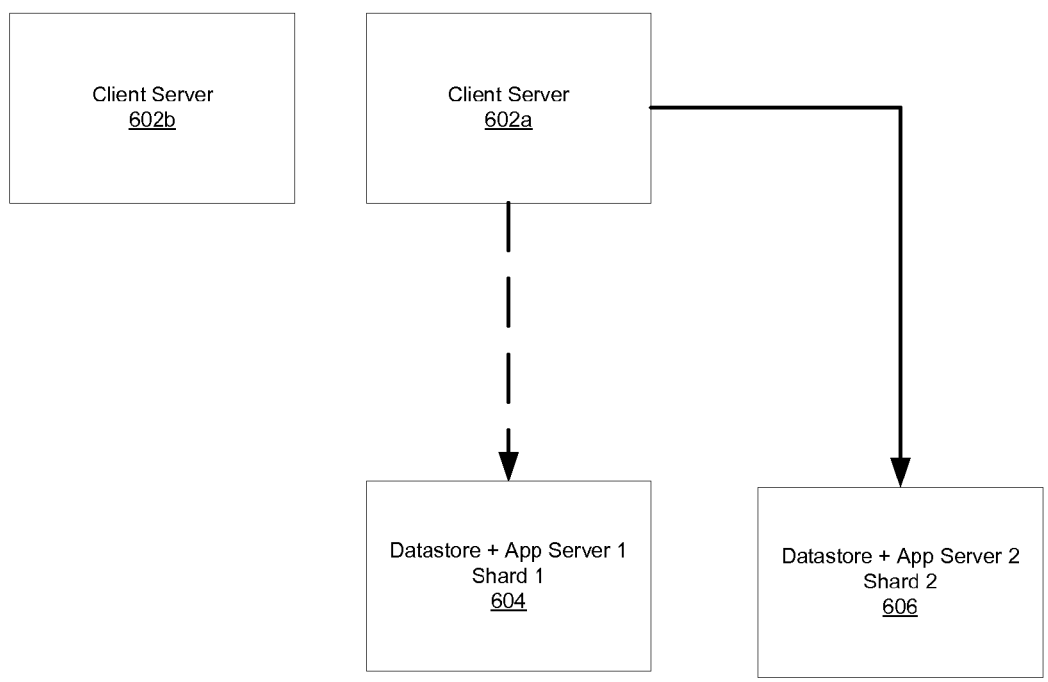
FIG. 6 illustrates utilizing an embedded application server in a distributed datastore for high availability in accordance with one embodiment.

FIG. 6 illustrates the high availability of the application server integrated with the distributed datastore. Upon initial connection from a client server 602a to one server 604 in the distribute datastore/application server cluster, the machine fails. The client retries the connection to any server in the cluster and successfully connects to a second server 606. Upon connection, the request can be served by the application server per normal.

A more complex use case includes a parallel processing request. Consider an implementation that aggregates the values of data points based on a user-defined set of identifiers, such as an Internet search system. The set of identifiers is sent to an embedded server 406a, which uses the distributed datastore's 408a data locality lookup API to identify the list of nodes 408b, 408c to which to send sub-requests. The sub-requests are created and sent by the embedded server 406a to the other embedded servers 406b, 406c to aggregate the data contained locally on those nodes 408b, 408c and send the response back to the original server 406a, which aggregates those results and returns the response to the requesting client 402.

As demonstrated by each of the above examples, by merging the application service 406 with the distributed datastore 408, the scalable and fault tolerant properties of the distributed datastores architecture provide a highly available application server, unlike conventional systems. Also, by using the native API of the distributed datastore the efficiency and physical awareness of an application can be greatly improved.

Figure 7:
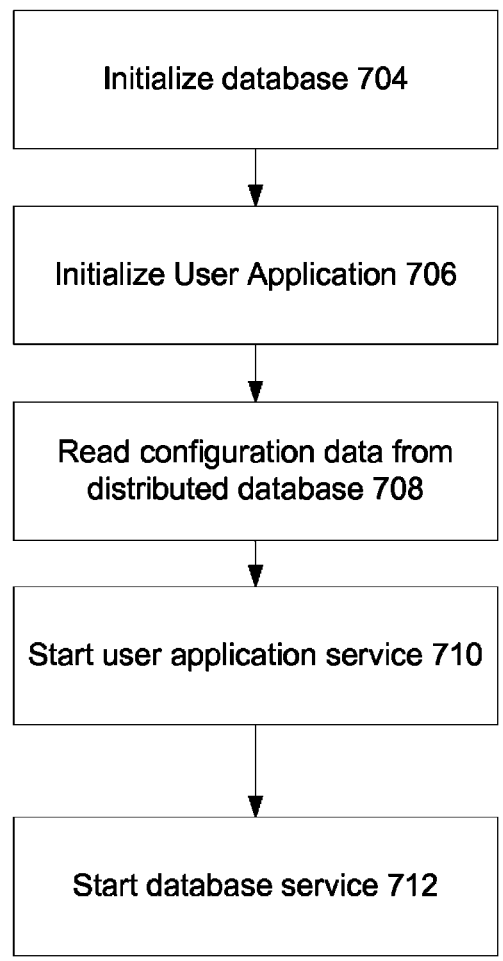
FIG. 7 illustrates a method for embedding the user application service in the datastore in accordance with one embodiment.

FIG. 7 illustrates a method for starting the datastore service in accordance with one embodiment. First, the datastore is initialized 704. In one embodiment, the distributed datastore allows the initiation of the application server upon the initiation of the distributed datastore. In one embodiment, the distributed datastore initializes 706 the application server. This may then include reading 708 application specific configuration data. Since the application is already running within a distributed datastore it can fetch this information using the internal datastore API. This allows all of the running copies of the application service to share the same configuration data across many machines. The final step is starting 710 the network service layer for the application server on a different network endpoint or port than the distributed datastores network service layer. Starting the services 710 and 712 exposes the application server and the datastore service to external clients. The application server's network service is in one embodiment started under its own thread so both services are exposed by one operating system process.

At runtime each distributed datastore node is running the embedded application service. This allows the application service to be accessed from any node.

Figure 8:
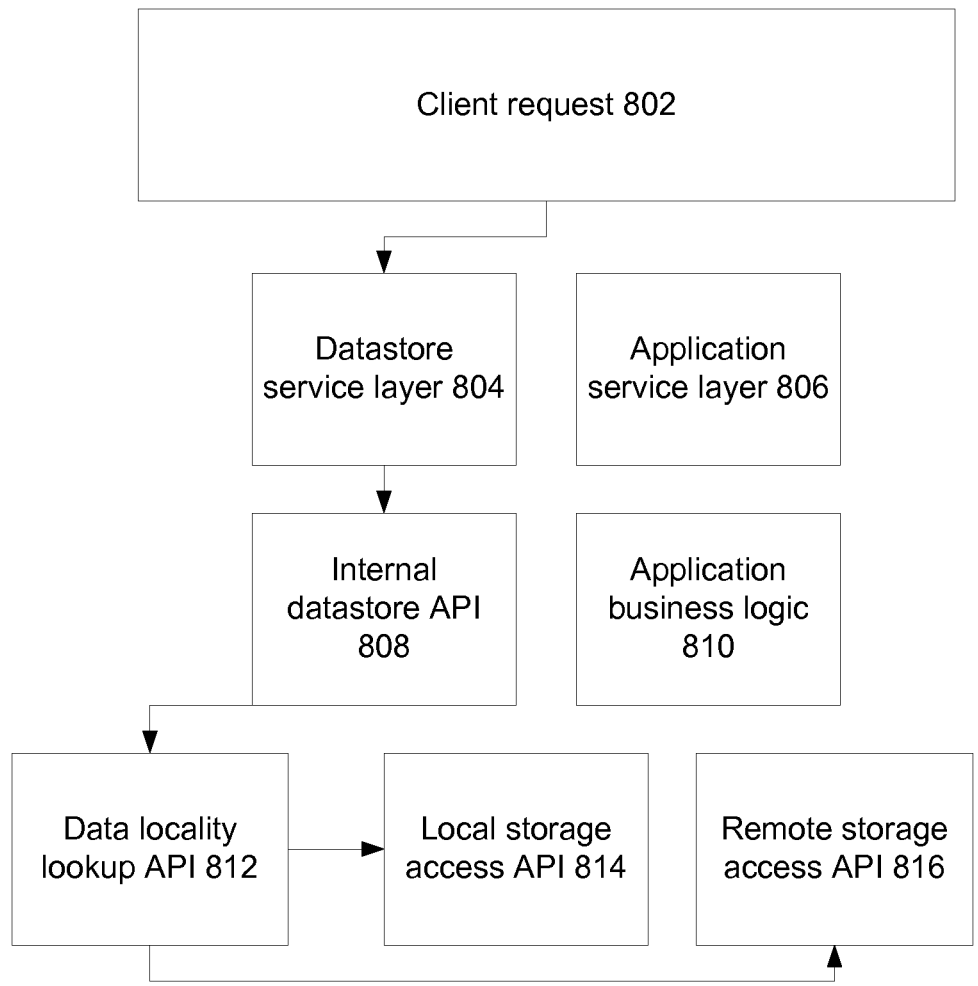
FIG. 8 illustrates components of an embedded service operating in conjunction with a distributed datastore in accordance with one embodiment.

FIG. 8 illustrates components of the joint distributed datastore and embedded application server in accordance with one embodiment. Client requests 802 enters the system through either the datastore service layer 804 or the embedded application server layer 806. Requests that enter though the datastore service layer are processed by the internal datastore API 808, which utilizes the data locality lookup API 812 plus a combination of local and remote storage access APIs 814, 816, respectively.

Figure 9:
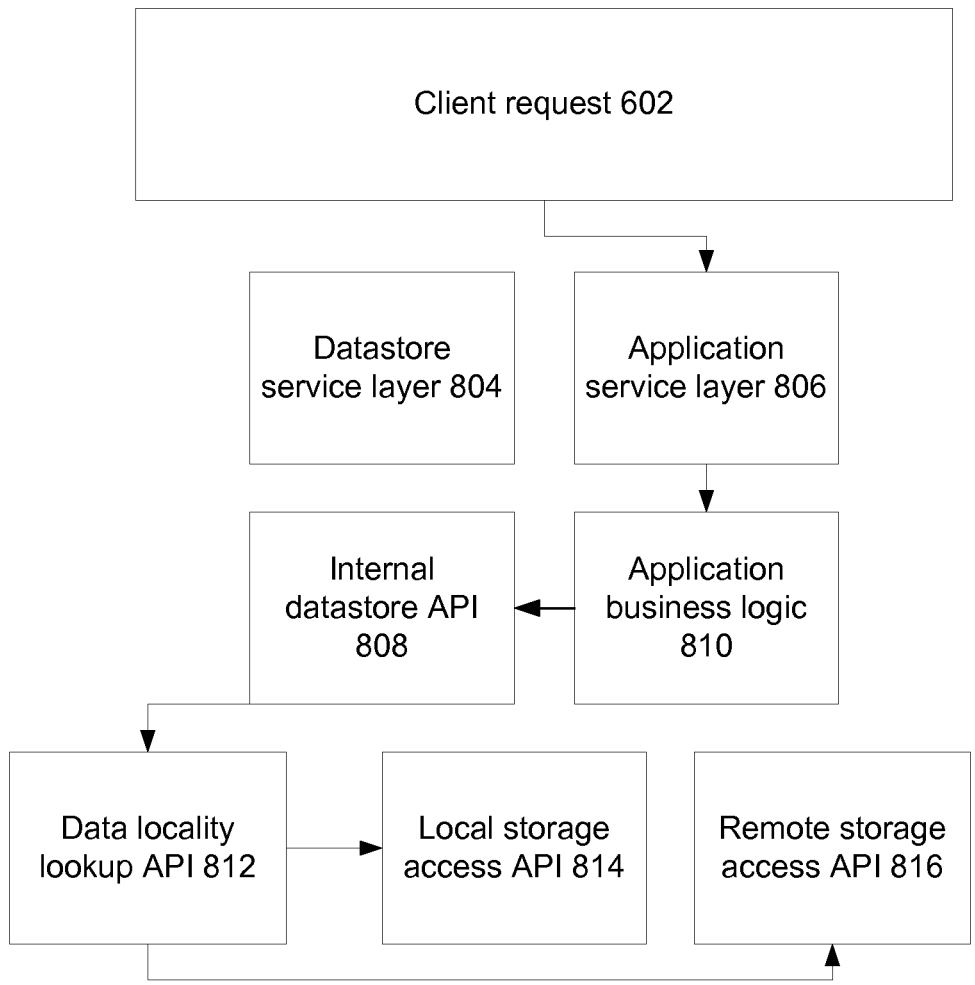
FIG. 9 illustrates components of an embedded service operating in conjunction with a distributed datastore in accordance with one embodiment.

FIG. 9 illustrates requests that enter through the application service API 806 are processed by the application business logic 810 which may also use the internal datastore API 808.

Figure 10:
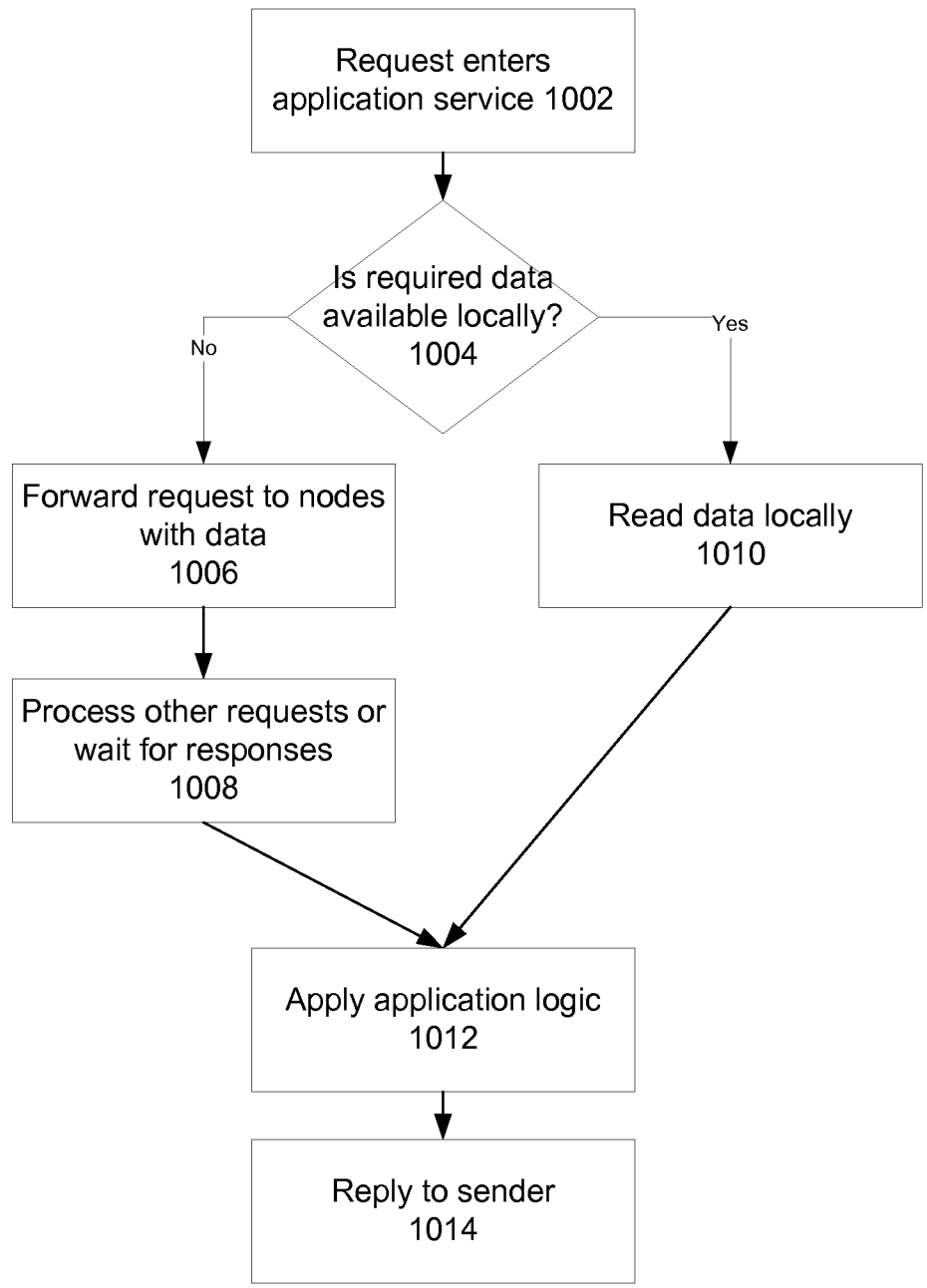
FIG. 10 illustrates the flow of a request in the embedded service utilizing the distributed datastores service in accordance with one embodiment.

FIG. 10 is a flowchart illustrating the request processing in accordance with one embodiment. A request comes in to the application service API 1002. The application service identifies the data it needs and uses the locality lookup API to identify whether 1004 the data is located locally or on other nodes in the distributed datastore. To find the location of any data record, the datastore identifies its primary key, which is derived in one embodiment from a user request, and passes it to a method, e.g., getActiveNodesForDataKey method. This method effectively finds the distributed datastore nodes that have access to the data for this key and are currently available to send requests to. There can be more than one node returned due to replication of that data item.

Returning to FIG. 10, if the data is located locally it uses the internal datastore API 608 to access the data locally 1010. Once the data is read locally, the application server applies business logic 1012 and responds to the request sender 1014.

If the data required for the request lives on different datastore nodes, the application forwards 1006 the request to another distributed datastore's embedded application service layer to be processed. While the request is being processed by the other node(s), the initial node can wait for a response or service 1008 other requests. Once the responses from the other nodes are all received, extra logic can be applied if required by the application server 1012 and the final response is sent to the request sender 1014.

The present invention has been described in particular detail with respect to a limited number of embodiments.

Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer system comprising:
   at least one computer processor;
   a plurality of storage servers, each storage server including a persistent storage device, each persistent storage device including a database shard, database shards of the plurality of storage servers forming a distributed datastore;
   a plurality of web containers, each web container embedded in and executed by one of the plurality of storage servers and each we b container configured to:
      obtain locality information associated with data stored in the distributed datastore;
      receive a client request for data stored in another one of the plurality of storage servers in the distributed datastore;
      forward, based on the locality information, the client request to the other one of the database shards that includes the requested data;
      retrieve, from the other one of the database shards in response to the client request, results of a command executed by application logic on a local data set by the other one of the database shards, the results including the requested data; and
      return the retrieved data in response to the client request.

2. The computer system of claim 1, wherein the locality information describes a locality of the data within the database shards.

3. The computer system of claim 1, wherein a piece of data stored in the distributed datastore is replicated across a plurality of the database shards.

4. The computer system of claim 1, wherein each web container is configured to forward the client request to the other one of the database shards responsive to determining that the requested data is not stored in a local data set of a database shard included in the storage server in which the web container is embedded.

5. The computer system of claim 1, wherein each web container is further configured to:
   receive a second client request for data in the distributed datastore;
   determine, based on the locality information, that the requested data is stored in a local data set of a database shard included in the storage server in which the web container is embedded;
   retrieve the requested data from the local data set of the database shard included in the storage server in which the web container is embedded; and return the retrieved data in response to the second client request.

6. The computer system of claim 1, wherein each web container is further configured to connect to a client responsive to a connection between the client and another web container failing.

7. The computer system of claim 1, wherein each web container is further configured to:
receive a second client request for data in the distributed datastore;
forward, based on the locality information, the client request to a plurality of the database shards that include the requested data;
receive, from the plurality of database shards, the requested data;
aggregate the data received from the plurality of database shards; and
return the aggregated data in response to the second client request.

8. A computer program product comprising a non-transitory computer-readable storing executable code of a plurality of web containers, each web container embedded in and executed by one of a plurality of storage servers including database shards forming a distributed datastore, the code when executed by at least one computer processor causes the computer processor to perform steps comprising:
obtaining locality information associated with data stored in the distributed datastore;
receiving a client request for data stored in another one of the plurality of storage servers in the distributed datastore;
forwarding, based on the locality information, the client request to the other one of the database shards that includes the requested data;
retrieving, from the other one of the database shards in response to the client request, results of a command executed by application logic on a local data set by the other one of the database shards, the results including the requested data; and
returning the retrieved data in response to the client request.

9. The computer program product of claim 8, wherein the locality information describes a locality of the data within the database shards.

10. The computer program product of claim 8, wherein the code when executed by the least one compute processor causes the computer processor to perform further steps comprising:
forwarding the client request to the other one of the database shards responsive to determining that the requested data is not stored in a local data set of a database shard included in the storage server in which the web container is embedded.

11. The computer program product of claim 8, wherein the code when executed by the least one compute processor causes the computer processor to perform further steps comprising:
receiving a second client request for data in the distributed datastore;
determining, based on the locality information, that the requested data is stored in a local data set of a database shard included in the storage server in which the web container is embedded;
retrieving the requested data from the local data set of the database shard included in the storage server in which the web container is embedded; and
returning the retrieved data in response to the second client request.

12. The computer program product of claim 8, wherein the code when executed by the least one compute processor causes the computer processor to perform further steps comprising:
connecting to a client responsive to a connection between the client and another web container failing.

13. The computer program product of claim 8, wherein the code when executed by the least one compute processor causes the computer processor to perform further steps comprising:
receiving a second client request for data in the distributed datastore;
forwarding, based on the locality information, the client request to a plurality of the database shards that includes the requested data;
receive, from the plurality of database shards, the requested data;
aggregate the data received from the plurality of database shards; and
return the aggregated data in response to the second client request.

14. In a computer system including a plurality of web containers each embedded in and executed by one of a plurality of storage servers including database shards forming a distributed datastore, a computer-implemented method comprising:
obtaining locality information associated with data stored in the distributed datastore;
receiving a client request for data stored in another one of the plurality of storage servers in the distributed datastore;
forwarding, based on the locality information, the client request to the other one of the database shards that includes the data;
retrieving, from the other one of the database shards in response to the client request, results of a command executed by application logic on a local data set by the other one of the database shards, the results including the requested data; and
returning the retrieved results in response to the client request.

15. The computer-implemented method of claim 14, wherein the locality information describes a locality of the data within the database shards.

16. The computer-implemented method of claim 14, wherein forwarding the client request comprises:
forwarding the client request to the other one of the database shards responsive to determining that the data is not stored in a local data set of a database shard included in the storage server in which the web container is embedded.

17. The computer-implemented method of claim 14, further comprising:
receiving a second client request for data in the distributed datastore;
determining, based on the locality information, that the requested data is stored in a local data set of a database shard included in the storage server in which the web container is embedded;
retrieving the requested data from the local data set of the database shard included in the storage server in which the web container is embedded; and
returning the retrieved data in response to the second client request.

18. The computer-implemented method of claim 14, further comprising:
 connecting to a client responsive to a connection between the client and another web container failing.

19. The computer-implemented method of claim 14, further comprising:
 receiving a second client request for data in the distributed datastore;
 forwarding, based on the locality information, the client request to a plurality of the database shards that includes the requested data;
 receive, from the plurality of database shards, the requested data;
 aggregate the data received from the plurality of database shards; and
return the aggregated data in response to the second client request.

* * * * *